US012630686B2

(12) United States Patent
Jang et al.

(10) Patent No.: US 12,630,686 B2
(45) Date of Patent: May 19, 2026

(54) POLYOLEFIN-BASED RESIN FOAM, AND MOLDED PRODUCT PRODUCED THEREFROM

(71) Applicant: LOTTE CHEMICAL CORPORATION, Seoul (KR)

(72) Inventors: Jun Hyeok Jang, Uiwang-si (KR); Yong Jin Kwon, Uiwang-si (KR); Se Yeon Eom, Uiwang-si (KR); Sung Hwan Lim, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 1052 days.

(21) Appl. No.: 17/773,930

(22) PCT Filed: Nov. 27, 2020

(86) PCT No.: PCT/KR2020/017193
§ 371 (c)(1),
(2) Date: May 3, 2022

(87) PCT Pub. No.: WO2021/107722
PCT Pub. Date: Jun. 3, 2021

(65) Prior Publication Data
US 2022/0389180 A1     Dec. 8, 2022

(30) Foreign Application Priority Data

Nov. 29, 2019     (KR) ......................... 10-2019-0156934

(51) Int. Cl.
| | |
|---|---|
| *C08J 9/00* | (2006.01) |
| *B29C 48/285* | (2019.01) |
| *C08K 3/04* | (2006.01) |
| *B29K 23/00* | (2006.01) |

(52) U.S. Cl.
CPC ............. *C08J 9/008* (2013.01); *B29C 48/288* (2019.02); *C08K 3/041* (2017.05); *B29K 2023/16* (2013.01); *C08J 2323/16* (2013.01); *C08K 2201/001* (2013.01)

(58) Field of Classification Search
CPC .. B29C 48/288; B29K 2023/16; C08J 9/0066; C08J 9/0076; C08J 9/008; C08J 9/18; C08J 9/232; C08J 2323/00; C08J 2323/08; C08J 2323/12; C08J 2323/16; C08J 2353/00; C08K 3/04; C08K 3/041; C08K 2201/001; C08K 2201/003; C08K 2201/004
See application file for complete search history.

(56) References Cited

U.S. PATENT DOCUMENTS

| | | | |
|---|---|---|---|
| 2012/0112134 A1 | 5/2012 | Jung et al. | |
| 2014/0329171 A1 | 11/2014 | Imaizumi et al. | |
| 2015/0102269 A1 | 4/2015 | Chiba et al. | |
| 2018/0057651 A1* | 3/2018 | Lin ........................ | C08J 9/0023 |
| 2020/0224000 A1 | 7/2020 | Yamanari et al. | |

FOREIGN PATENT DOCUMENTS

| | | |
|---|---|---|
| EP | 3498765 A1 | 6/2019 |
| JP | 07-304895 A | 11/1995 |
| JP | 2005-256007 A | 9/2005 |
| JP | 2012-532085 A1 | 12/2012 |
| JP | 2013-139550 A | 7/2013 |
| KR | 10-2008-0062448 A | 7/2008 |
| KR | 10-2010-0136079 A | 12/2010 |
| KR | 10-2014-0099997 A | 8/2014 |
| KR | 10-2014-0132961 A | 11/2014 |
| KR | 10-2014-0141585 A | 12/2014 |
| KR | 10-1948809 B1 | 2/2019 |
| KR | 10-2019-0071184 A | 6/2019 |
| WO | 2019/044422 A1 | 3/2019 |
| WO | 2021/107722 A1 | 6/2021 |

OTHER PUBLICATIONS

Office Action in counterpart Korean Application No. 10-2019-0156934 dated Aug. 17, 2022, pp. 1-4.
Office Action in counterpart Japanese Application No. 2022-526401 dated Aug. 6, 2024, pp. 1-2.
International Search Report in counterpart International Application No. PCT/KR2020/017193 dated Mar. 22, 2021, pp. 1-5.

* cited by examiner

*Primary Examiner* — John M Cooney
(74) *Attorney, Agent, or Firm* — Additon, Pendleton & Witherspoon, P.A.

(57)     ABSTRACT

The present invention relates to: a polyolefin-based resin foam including a polyolefin-based resin and a conductive filler containing carbon nanotubes and carbon black, wherein the weight ratio of the carbon nanotubes to the carbon black is about 1:1.5 to about 1:5; and a molded product produced therefrom. The polyolefin-based resin foam according to the present invention includes the carbon nanotubes and the carbon black in an appropriate ratio, and thus a molded product having good bondability and exhibiting low surface resistance and surface resistance deviation can be produced by molding the same.

9 Claims, No Drawings

POLYOLEFIN-BASED RESIN FOAM, AND MOLDED PRODUCT PRODUCED THEREFROM

CROSS-REFERENCE TO RELATED APPLICATIONS

This application claims priority to and the benefit of International Application No. PCT/KR2020/017193, filed Nov. 27, 2020, which published as WO 2021/107722 on Jun. 3, 2021, and Korean Patent Application No. 10-2019-0156934, filed in the Korean Intellectual Property Office on Nov. 29, 2019, the entire disclosure of each of which is incorporated herein by reference.

TECHNICAL FIELD

The present invention relates to a polyolefin resin foam and a molded product produced therefrom and, more specifically, to a polyolefin resin foam that includes carbon nanotubes and carbon black in a suitable ratio to provide a molded product having good fusibility and good surface resistance, and a molded product produced therefrom.

BACKGROUND ART

In general, foamed products are formed of synthetic resins including polystyrene resins, polyurethane resins, polyolefin resins, and the like. Thereamong, the polyolefin resins have been increasingly used and expansion of the polyolefin resins have been continuously developed due to eco-friendliness and recyclability thereof. Furthermore, molded products produced from polyolefin resin foams exhibit good properties in terms of chemical resistance, heat resistance, and compressive strength and are used in a wide range of applications including packaging materials, building materials, automobile parts, and the like.

However, most polyolefin resins are non-polar, providing a disadvantage in that a molded product produced therefrom can be easily charged or can charge other materials to generate static electricity due to friction between the molded products, friction between the molded product and other materials, or electric external force around the molded product. Since such a charging phenomenon can cause product damage or contamination, there is a need to impart electrical conductivity to the molded product to exhibit antistatic performance.

Patent Document 1 (JP Unexamined Patent Publication No. H7-304895) discloses polypropylene resin foam particles produced by foaming resin particles including a polypropylene resin and a non-ionic surfactant having antistatic properties. However, a foamed product produced from the foam particles of Patent Document 1 exhibits a high surface resistance of $10^9$ Ohm/sq or more and has problems of moisture dependency and property variation over time.

Accordingly, as a method of preparing a polyolefin resin composition capable of producing a foamed product having a low surface resistance of $10^6$ Ohm/sq or less, it is suggested to add conductive fillers, such as carbon black, graphite, carbon fiber, metal powder, metal-coated inorganic powder, metal fibers, and the like.

For example, Patent Document 2 (JP Unexamined Patent Publication No. 2005-256007) discloses expandable resin particles produced by foaming polypropylene resin particles containing 10 wt % or more of conductive carbon and 0.01 wt % to 5 wt % of a water-soluble inorganic material with a foaming agent. According to Patent Document 2, it is necessary to add a large amount of the conductive carbon in order to obtain a foamed product having low surface resistance ($<10^6$ Ohm/sq). However, increase in conductive carbon content can cause generation of dust and deterioration in workability.

Patent Document 3 (KR Patent Laid-open Publication No. 2019-0071184) discloses conductive foam beads formed of a resin composition and including multiple cells having an average diameter of 10 μm to 200 μm, in which the resin composition comprises a polyolefin resin; a carbon nanotube aggregate composed of multiple carbon nanotubes having an average outer diameter of 8 nm to 50 nm and an average inner diameter corresponding to 40% or more of the average outer diameter; and a foaming agent. However, when the carbon nanotubes are used alone as conductive fillers, the beads have a problem of surface resistance deviation, despite good surface resistance ($<10^6$ Ohm/sq). Increase in content of the carbon nanotubes to solve this problem causes deterioration in fusibility upon molding.

DISCLOSURE

Technical Problem

The present invention has been conceived to solve such problems in the art and it is an aspect of the present invention to provide a polyolefin resin foam that can provide a molded product having good fusibility, low surface resistance and low surface resistance deviation at each measurement location thereof.

It is another aspect of the present invention to provide a molded product produced from the polyolefin resin foam.

Technical Solution

1. One embodiment of the present invention provides a polyolefin resin foam including: a polyolefin resin; and conductive fillers including carbon nanotubes and carbon black, wherein the carbon nanotubes and the carbon black are present in a weight ratio of about 1:1.5 to about 1:5.
2. In embodiment 1, the foam may include about 87 wt % to about 93 wt % of the polyolefin resin and about 7 wt % to about 13 wt % of the conductive fillers.
3. In embodiment 1 or 2, the polyolefin resin may include at least one selected from the group consisting of homo-polypropylene (homo-PP); a random copolymer formed through polymerization of at least two monomers selected from the group consisting of propylene, ethylene, butylene and octene; a block copolymer formed by blending ethylene-propylene rubber with polypropylene; and a copolymer of polyethylene, ethylene vinyl acetate and α-olefin.
4. In any one of embodiments 1 to 3, the carbon nanotubes may have an average diameter of about 3 nm to about 15 nm and an average length of about 10 μm to about 25 μm.
5. In any one of embodiments 1 to 4, the carbon nanotubes may be present in an amount of about 2 wt % to about 3 wt % based on the total weight of the foam.
6. In any one of embodiments 1 to 5, the carbon black may be present in an amount of about 5 wt % to about 10 wt % based on the total weight of the foam.
7. In any one of embodiments 1 to 6, the conductive fillers may further include at least one selected from the group consisting of graphite, carbon fiber, graphite, graphene, metal powder, metal fiber, and conductive polymers.

8. In any one of embodiments 1 to 7, the foam may further include at least one additive selected from the group consisting of an antioxidant, a UV stabilizer, a flame retardant, a coloring agent, a plasticizer, a heat stabilizer, a slip agent, and an antistatic agent.

9. In embodiment 8, the additive may be present in an amount of about 0.1 parts by weight to about 15 parts by weight relative to 100 parts by weight of the conductive fillers and the polyolefin resin.

10. Another embodiment of the present invention provides a molded product produced from the polyolefin resin foam.

11. In embodiment 10, the molded product may have a surface resistance of about $10^1$ Ohm/sq to about $10^6$ Ohm/sq.

12. In embodiment 10 or 11, the molded product may have a surface resistance deviation of about $10^{0.5}$ Ohm/sq or less.

Advantageous Effects

Embodiments of the present invention provide polyolefin resin foams that provide molded products having a good surface resistance of $10^6$ Ohm/sq or less, thereby realizing stable antistatic performance.

In addition, molded products produced from the polyolefin resins foam according to the embodiments of the invention exhibit low surface resistance deviation at each measurement location, thereby securing high quality.

Further, the polyolefin resin foams according to the embodiments of the invention exhibit good fusibility upon molding.

BEST MODE

Herein, the singular forms "a", "an" and "the" are intended to include the plural forms as well, unless the context clearly indicates otherwise.

Further, the terms "comprise," "include," and/or "have," when used in this specification, specify the presence of stated features, steps, operations, elements, and/or components, but do not preclude the presence or addition of one or more other features, steps, operations, elements, components, and/or groups.

It will be understood that, although the terms "first", "second", and the like may be used herein to describe various elements and/or components, these elements, and/or components should not be limited by these terms. These terms are only used to distinguish one element or component from another element or component.

Further, a numerical value related to a certain component is construed to include a tolerance range in interpretation of components, unless clearly stated otherwise.

As used herein to represent a specific numerical range, the expression "a to b" means "≥a and ≤b".

One embodiment of the present invention provides a polyolefin resin foam including: a polyolefin resin; and conductive fillers including carbon nanotubes and carbon black, wherein the carbon nanotubes and the carbon black are present in a weight ratio of about 1:1.5 to about 1:5 (for example, 1:1.5, 1:1.6, 1:1.7, 1:1.8, 1:1.9, 1:2, 1:2.1, 1:2.2, 1:2.3, 1:2.4, 1:2.5, 1:2.6, 1:2.7, 1:2.8, 1:2.9, 1:3, 1:3.1, 1:3.2, 1:3.3, 1:3.4, 1:3.5, 1:3.6, 1:3.7, 1:3.8, 1:3.9, 1:4, 1:4.1, 1:4.2, 1:4.3, 1:4.4, 1:4.5, 1:4.6, 1:4.7, 1:4.8, 1:4.9, or 1:5). If the weight ratio of the carbon black to the carbon nanotubes is less than about 1.5, it is necessary to provide a high content of carbon nanotubes in order to achieve a surface resistance of $10^6$ Ohm/sq or less. As such, a polyolefin resin foam containing a high content of carbon nanotubes exhibits poor fusibility between foam particles upon molding, thereby causing deterioration in moldability and mechanical properties of a final product. In addition, as the content of the carbon black is decreased below about 1.5 times the content of the carbon nanotubes, a molded product suffers from significant increase in surface resistance deviation at each measurement location thereof. Conversely, if the weight ratio of the carbon black to the carbon nanotubes exceeds about 5, there occurs problems of deterioration in workability and dust generation due to an excess of the carbon black. Specifically, according to one embodiment, the carbon nanotubes and the carbon black may be present in a weight ratio of about 1:1.5 to about 1:4, more specifically about 1:1.5 to about 1:3.5, still more specifically about 1:1.7 to about 1:3, without being limited thereto.

According to one embodiment, the polyolefin resin foam may include about 87 wt % to about 93 wt % of the polyolefin resin (for example, 87 wt %, 88 wt %, 89 wt %, 90 wt %, 91 wt %, 92 wt %, or 93 wt %), and about 7 wt % to about 13 wt % of the conductive fillers (for example, 7 wt %, 8 wt %, 9 wt %, 10 wt %, 11 wt %, 12 wt %, or 13 wt %). With these ranges of the polyolefin resin and the conductive fillers, the foam is more advantageous in manufacture of a molded product having good surface resistance and can exhibit better fusibility upon molding, but is not limited thereto.

Next, components of the polyolefin resin foam according to embodiments of the present invention will be described in more detail.

According to the embodiments of the present invention, the polyolefin resin is used as a base resin constituting the foam and has advantages including light weight, inexpensiveness, and easy molding through various methods, such as injection molding, extrusion molding, vacuum molding, and the like, to be used in various applications including automobile materials, packaging materials, building materials, industrial materials, and the like. The polyolefin resin may be selected from any typical polyolefin resins in the art without limitation. Specifically, according to one embodiment, the polyolefin resin may include at least one selected from the group consisting of homo-polypropylene (homo-PP); a random copolymer formed through polymerization of at least two monomers selected from the group consisting of propylene, ethylene, butylene and octene; a block copolymer formed by blending ethylene-propylene rubber with polypropylene; and a copolymer of polyethylene, ethylene vinyl acetate and α-olefin, without being limited thereto.

According to the embodiments of the invention, the carbon nanotubes are used as a material for imparting electrical conductivity to a polyolefin resin, which is a non-conductive material, and refer to a tube-shaped nanomaterial formed by winding a graphite plate composed of hexagonal rings each consisting of six carbon atoms and connected to one another into a cylindrical shape. Upon expansion and molding of a resin composition containing such carbon nanotubes, the carbon nanotubes improve antistatic performance of a final product through reduction in surface resistance thereof. The carbon nanotubes may include any carbon nanotubes well-known in the art. Specifically, the carbon nanotubes may include at least one type of carbon nanotubes selected from the group consisting of single-wall carbon nanotubes, double-wall carbon nanotubes, multiwall carbon nanotubes, and bundle type carbon nanotubes, without being limited thereto.

According to one embodiment, the carbon nanotubes may have an average diameter of about 3 nm to about 15 nm (for example, 3 nm, 4 nm, 5 nm, 6 nm, 7 nm, 8 nm, 9 nm, 10 nm, 11 nm, 12 nm, 13 nm, 14 nm, or 15 nm) and an average length of about 10 μm to about 25 μm (for example, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, or 25 μm). Specifically, the carbon nanotubes may have an average diameter of about 3 nm to about 9 nm and an average length of about 15 μm to about 25 μm. Within these ranges of average diameter and average length, the carbon nanotubes can be more advantageous in preparation of a polyolefin resin foam that secures dispersion in a polyolefin resin matrix to form a molded product having low surface resistance deviation and further reduced surface resistance, but are not limited thereto. Here, the average diameter of the carbon nanotubes may be measured through image analysis by TEM and the average length thereof may be measured through image analysis by SEM, without being limited thereto.

According to one embodiment, the carbon nanotubes may be present in an amount of about 2 wt % to about 3 wt % (for example, 2 wt %, 2.1 wt %, 2.2 wt %, 2.3 wt %, 2.4 wt %, 2.5 wt %, 2.6 wt %, 2.7 wt %, 2.8 wt %, 2.9 wt %, or 3 wt %) based on the total weight of the foam. Within this range, the foam can exhibit better fusibility upon molding and allows easier formation of an electrical path, thereby providing a molded product having lower surface resistance.

According to the embodiments of the present invention, the carbon black is fine carbon black powder obtained through incomplete combustion of various compounds containing hydrocarbon or carbon atoms. The carbon black is included in the polyolefin resin foam to impart electrical conductivity while reducing surface resistance deviation at each measurement location together with the carbon nanotubes.

According to one embodiment, the carbon black may be present in an amount of about 5 wt % to about 10 wt % (for example, 5 wt %, 6 wt %, 7 wt %, 8 wt %, 9 wt %, or 10 wt %) based on the total weight of the foam. Within this range, the foam can exhibit better workability through reduction in dust generation and is more advantageous in production of a molded product having low surface resistance deviation.

According to the present invention, the conductive fillers serve to improve electrical conductivity and mechanical properties, and may further include typical fillers used in the art. Specifically, according to one embodiment, the conductive fillers may further include at least one selected from the group consisting of graphite, carbon fiber, graphite, graphene, metal powder, metal fiber, and conductive polymers. The conductive fillers may have an average particle diameter of about 0.01 μm to about 30 without being limited thereto.

According to the present invention, the polyolefin resin foam may further include typical additives used in the art. Specifically, according to one embodiment, the polyolefin resin foam may further include at least one additive selected from the group consisting of an antioxidant, a UV stabilizer, a flame retardant, a coloring agent, a plasticizer, a heat stabilizer, a slip agent, and an antistatic agent. These additives serve to improve performance and processability of the polyolefin resin foam and may be selected from various additives known in the art without departing from the spirit of the present invention.

The content of each additive may be adjusted within an optimal range in consideration of a total preparation amount and a preparation process within a well-known range in preparation of the polyolefin resin foam. Specifically, according to one embodiment, the additives may be present in an amount of about 0.1 parts by weight to about 15 parts by weight relative to 100 parts by weight of the conductive fillers and the polyolefin resin.

The polyolefin resin foam may be prepared by a well-known method. For example, a method of preparing the foam may include: (1) mixing a polyolefin resin; and conductive fillers including carbon nanotubes and carbon black to prepare a polyolefin resin composition, (2), with the polyolefin resin composition placed in a reactor, injecting a foaming agent into the reactor, followed by heating and pressing the polyolefin resin composition, and (3) ejecting the resin composition from the reactor at a lower pressure than a pressure upon pressing the resin composition. Here, the carbon nanotubes and the carbon black may be present in a weight ratio of about 1:1.5 to about 1:5.

Specifically, in step (1), the polyolefin resin and the conductive fillers may be mixed with each other, followed by melt extrusion in an extruder to prepare the polyolefin resin composition. Here, the polyolefin resin composition may be prepared in pellet or bead form, specifically in mini-pellet form, through melt extrusion. The polyolefin resin composition prepared in mini-pellet form can be easily handled in the course of processing. In preparation of the polyolefin resin composition, various additives may be mixed together with the polyolefin resin and the conductive fillers, as needed. Melt extrusion may be performed at a screw speed of about 50 rpm to about 500 rpm and at an extrusion temperature of about 150° C. to about 240° C. for a residing time of about 5 sec to about 90 sec, without being limited thereto. Melt extrusion may be performed using a single-screw extruder, a twin-screw extruder, a kneader, and the like.

In step (2), the polyolefin resin composition may be fed into the reactor in which a dispersion medium containing a dispersion agent is present, or may be fed into the reactor together with a dispersion agent and a dispersion medium. Then, the foaming agent is injected into the reactor in which the polyolefin resin composition, the dispersing agent and the dispersion medium are placed, followed by heating and pressing. Here, heating and pressing may be performed at a temperature of about 130° C. to about 150° C. and at a pressure of about 20 kgf/cm$^2$ to about 50 kgf/cm$^2$, without being limited thereto.

The dispersion medium may include at least one selected from the group consisting of water, ethylene glycol, glycerin, methanol and ethanol, specifically water, without being limited thereto. In addition, the dispersion agent may include at least one selected from the group consisting of higher fatty acids, higher fatty acid esters, and higher fatty acid amides, without being limited thereto.

The foaming agent may be selected from any foaming agent well-known in the art. Specifically, the foaming agent may include at least one selected from the group consisting of propane, butane, hexane, pentane, heptane, cyclobutane, cyclohexane, methyl chloride, ethyl chloride, methylene chloride, dimethyl ether, diethyl ether, methylethylether, nitrogen, carbon dioxide, and argon. The foaming agent may be added in an amount about 5 parts by weight to about 50 parts by weight relative to 100 parts by weight of the polyolefin resin and the conductive fillers. Within this range, it is possible to achieve uniform foaming.

Step (3) may include continuously injecting the foaming agent into the reactor to maintain pressure inside the reactor. Upon discharge of the resin composition from the reactor at low pressure, the foaming agent is continuously injected into the reactor to prevent rapid decrease in pressure inside the reactor. In order to obtain foam particles having uniform appearance and density, it is desirable that the foam particles be discharged from the reactor at a constant pressure.

In the course of proceeding from step (2) to step (3), that is, in the course of discharging the foam particles at low pressure, foam cells may be formed in the foam particles and may have a size of about 30 μm to about 400 μm. Such foam particles provide a molded product having good mechanical properties and can improve productivity.

Another embodiment of the present invention provides a molded product produced from the polyolefin resin foam.

According to one embodiment, the molded product has a surface resistance of about $10^1$ Ohm/sq to about $10^6$ Ohm/sq (for example, $10^1$ Ohm/sq, $10^2$ Ohm/sq, $10^3$ Ohm/sq, $10^4$ Ohm/sq, $10^5$ Ohm/sq, or $10^6$ Ohm/sq), specifically about $10^1$ Ohm/sq to about $10^5$ Ohm/sq, more specifically about $10^3$ Ohm/sq to about $10^{4.5}$ Ohm/sq. The polyolefin resin foam according to the present invention provides a molded product having low surface resistance, as described above, thereby realizing stable antistatic performance.

According to one embodiment, the molded product may have a surface resistance deviation of about $10^{0.5}$ Ohm/sq or less. Through minimization of surface resistance deviation at each measurement location, the polyolefin resin foam can provide a high quality molded product.

The molded product may be obtained by a typical molding method in the art. For example, the molded product may be obtained by filling a mold with the polyolefin resin foam, heating the mold to a high temperature using a heat medium, such as steam, and cooling the mold.

Next, the present invention will be described in more detail with reference to examples. However, it should be noted that these examples are provided for illustration only and should not be construed in any way as limiting the invention.

EXAMPLE

Example 1

93 wt % of random polypropylene (Manufacturer: Lotte Chemical Co., Ltd., Product Name: SEP-550, propylene-ethylene random copolymer, Random-PP), 2 wt % of carbon nanotubes (Manufacturer: LG Chemical Co., Ltd., Product Name: CP1002M, average diameter: 9 nm, average length: 19 μm), and 5 wt % of carbon black (Manufacturer: Orion Co., Ltd., Product Name: HIBLACK® 20L) were fed into a twin-axis extruder (screw diameter 39.8 mm, L/D 40) at a feeding speed of 15 kg/hr, followed by melt extrusion at a screw speed of 360 rpm and at an extrusion temperature of 210° C. A strand-shaped extrudate obtained through melt extrusion was cooled by water and formed into a cylindrical polypropylene resin composition (hereinafter referred to as "polypropylene pellets") having a weight of 1.0 mg to 1.2 mg and a size of φ0.7 mm×1 mm using a pelletizer.

Then, 100 parts by weight of the polypropylene pellets was fed into an autoclave together with 300 parts by weight of water containing 0.5% of a dispersion agent (Manufacturer: Ilshin Wells Co., Ltd., Product Name: TWEEN-60, Polyoxyethylene sorbitan monostearate). Thereafter, as a foaming agent, carbon dioxide ($CO_2$) was fed into the autoclave and the inner temperature of the autoclave was raised to 147° C. while stirring the pellets under a pressure of 40 kgf/cm². Thereafter, the contents in the autoclave were exposed to air to prepare foam. Here, an expansion magnification was 30 times and the foam prepared in this way had foam cells having an average size of 150 μm.

Then, the foam was dried in an oven at 60° C. for 24 hours. The dried foam was left at room temperature under atmospheric pressure for 48 hours and fed to a mold (450 mm×450 mm×50 mm). Saturated steam (pressure: 2.5 bar) was supplied to the mold for 30 seconds to allow fusion between the foams, followed by drying in the oven at 60° C. for 24 hours, thereby providing a molded product.

Examples 2 and 3 and Comparative Examples 1 to 4

Molded products were manufactured in the same manner as in Example 1 except that the amounts of Random-PP, carbon nanotubes and carbon black were adjusted as listed in Table 1.

Example 4

A molded product was manufactured in the same manner as in Example 1 except that carbon nanotubes having an average diameter of 10 nm and an average length of 14 μm (Manufacturer: LG Chemical Co., Ltd., Product Name: LUCAN BT1003M) were used instead of the carbon nanotubes used in Example 1.

<Evaluation Method>

1. Average Surface Resistance (Unit: Ohm/sq)

Surface resistance was measured at 5 different points (specifically, at front, back, both sides, and central points) on each of the molded products prepared in Examples 1 to 4 and Comparative Examples 1 to 4 using a surface resistance tester (SIMCO, ST-4) and averaged.

2. Surface Resistance Deviation (Unit: Ohm/sq)

Surface resistance was measured at 5 different points (specifically, front, back, both sides, and central points) on each of the molded products prepared in Examples 1 to 4 and Comparative Examples 1 to 4 using a surface resistance tester (SIMCO, ST-4) and averaged, followed by measuring a difference in surface resistance in each region with respect to the average surface resistance. Here, a smaller surface resistance deviation indicates more uniform surface resistance at each region.

3. Fusibility (Moldability)

Each of the molded products prepared in Examples 1 to 4 and Comparative Examples 1 to 4 was bent and fractured to prepare a specimen, followed by photographing a cross-section of the specimen through a microscope to evaluate fusibility of the corresponding foam. Specifically, when the foam was observed in a cracked or split form on a fracture surface of the molded product, the foam was evaluated to have good fusibility, and when the foam was exposed on the fracture surface of the molded product, the foam was evaluated to have poor fusibility.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Random-PP (wt %) | 93 | 92 | 87 | 92 | 96 | 94 | 93 | 90.5 |
| Carbon nanotubes (A) (wt %) | 2 | 3 | 3 | 3 | 4 | 4 | 1 | 4 |
| Carbon black(B) (wt %) | 5 | 5 | 10 | 5 | 0 | 2 | 6 | 5 |
| A:B (weight ratio) | 1:2.5 | 1:1.7 | 1:3 | 1:1.7 | 1:0 | 1:0.5 | 1:6 | 1:1.25 |
| Average surface resistance (Ohm/sq) | $10^{4.1}$ | $10^{3.9}$ | $10^{3.3}$ | $10^{5.5}$ | $10^{3.5}$ | $10^{3.4}$ | $10^{8.8}$ | $10^{3.3}$ |
| Surface resistance deviation (Ohm/sq) | $<10^{0.5}$ | $<10^{0.5}$ | $<10^{0.5}$ | $<10^{0.5}$ | $<10^{1.0}$ | $<10^{1.0}$ | $<10^{0.5}$ | $<10^{0.5}$ |
| Fusibility | Good | Good | Good | Good | Poor | Poor | Normal | Poor |

Referring to Table 1, it could be seen that the molded products of Example 1 to 4 comprising the carbon nanotubes and the carbon black in a weight ratio of about 1:1.5 to about 1:5 had a low surface resistance of $10^6$ Ohm/sq or less and a low surface resistance deviation of less than $10^{0.5}$ Ohm/sq. In addition, all of the foam specimens prepared in Examples 1 to 4 exhibited good fusibility.

Conversely, it could be seen that the molded products of Comparative Examples 1, 2 and 4, in which the weight ratio of the carbon black to the carbon nanotubes was less than 1.5, exhibited poor fusibility. In addition, it could be seen that the molded product of Comparative Example 3, in which the weight ratio of the carbon black to the carbon nanotubes was greater than 5, exhibited higher surface resistance and slightly poorer fusibility than the molded products prepared in Examples 1 to 4.

On the other hand, it could be seen that the molded products of Examples 1 to 3 comprising carbon nanotubes having an average diameter of 9 nm and an average length of 19 μm had lower surface resistance than the molded product of Example 4 comprising carbon nanotubes having an average diameter of 10 nm and an average length of 14 μm, indicating that antistatic performance of the foam would be further improved through adjustment of the average diameter and the average length of the carbon nanotubes.

Although some embodiments have been described herein, it will be understood by those skilled in the art that various modifications, changes, and alterations can be made without departing from the spirit and scope of the invention. Therefore, it should be understood that these embodiments are provided for illustration only and are not to be construed in any way as limiting the present invention. The scope of the present invention should be defined by the appended claims rather than by the foregoing description, and the claims and equivalents thereto are intended to cover such modifications and the like as would fall within the scope of the present invention.

The invention claimed is:

1. A polyolefin resin foam comprising:
about 87 wt % to about 93 wt % of a polyolefin resin; and
about 7 wt % to about 13 wt % of conductive fillers comprising carbon nanotubes and carbon black,
wherein the carbon nanotubes are present in an amount of about 2 wt % to about 3 wt % based on the total weight of the foam,
wherein the carbon black is present in an amount of about 5 wt % to about 10 wt % based on the total weight of the foam, and
wherein the carbon nanotubes and the carbon black are present in a weight ratio of about 1:1.5 to about 1:5.

2. The polyolefin resin foam according to claim 1, wherein the polyolefin resin comprises at least one selected from the group consisting of homo-polypropylene (homo-PP); a random copolymer formed through polymerization of at least two monomers selected from the group consisting of propylene, ethylene, butylene and octene; a block copolymer formed by blending ethylene-propylene rubber with poly-propylene; and a copolymer of polyethylene, ethylene vinyl acetate and α-olefin.

3. The polyolefin resin foam according to claim 1, wherein the carbon nanotubes have an average diameter of about 3 nm to about 15 nm and an average length of about 10 μm to about 25 μm.

4. The polyolefin resin foam according to claim 1, wherein the conductive fillers further comprise at least one selected from the group consisting of graphite, carbon fiber, graphene, metal powder, metal fiber, and conductive polymers.

5. The polyolefin resin foam according to claim 1, further comprising: at least one additive selected from the group consisting of an antioxidant, a UV stabilizer, a flame retardant, a coloring agent, a plasticizer, a heat stabilizer, a slip agent, and an antistatic agent.

6. The polyolefin resin foam according to claim 5, wherein the additive is present in an amount of about 0.1 parts by weight to about 15 parts by weight relative to 100 parts by weight of the conductive fillers and the polyolefin resin.

7. A molded product produced from the polyolefin resin foam according to claim 1.

8. The molded product according to claim 7, wherein the molded product has a surface resistance of about $10^1$ Ohm/sq to about $10^6$ Ohm/sq.

9. The molded product according to claim 7, wherein the molded product has a surface resistance deviation of about $10^{0.5}$ Ohm/sq or less.

* * * * *